United States Patent [19]

Miura et al.

[11] Patent Number: 4,911,260
[45] Date of Patent: Mar. 27, 1990

[54] FOUR-WHEEL DRIVE VEHICLE

[75] Inventors: Masakatsu Miura, Kariya; Tatsuya Iwatsuki, Okazaki; Seitoku Kubo, Toyota, all of Japan

[73] Assignees: Aisin-Warner Limited, Anjo; Toyota Jidosha Kabushiki Kaisha, Toyota, both of Japan

[21] Appl. No.: 231,008

[22] Filed: Aug. 11, 1988

Related U.S. Application Data

[62] Division of Ser. No. 813,003, Dec. 24, 1985, Pat. No. 4,763,749.

[30] Foreign Application Priority Data

Dec. 27, 1984 [JP] Japan ................... 59-275825

[51] Int. Cl.$^4$ ........................ B60R 17/35
[52] U.S. Cl. ........................ 180/249; 180/248; 475/86; 475/221
[58] Field of Search ............. 180/233, 247, 248, 249, 180/250, 252; 74/710.5, 665 G

[56] References Cited

U.S. PATENT DOCUMENTS 4,541,503  9/1985  Ashikawa ............. 180/247
4,589,304  5/1986  Ashikawa ............. 74/714

FOREIGN PATENT DOCUMENTS 56921   4/1983  Japan .................. 180/233
81226   5/1984  Japan .................. 180/248
2098148 11/1982  United Kingdom ........ 180/249

Primary Examiner—Charles A. Marmor
Assistant Examiner—Donn McGiehan
Attorney, Agent, or Firm—Spencer & Frank

[57] ABSTRACT

A four-wheel drive vehicle has an engine output shaft; a transmission having an input shaft connected to the output shaft and an output shaft connected through a transmission mechanism to the input shaft; a drive gear meshed with an output gear connected to the output shaft of the transmission; a front wheel side power transmitting mechanism; a rear wheel side power transmitting mechanism; a center differential mechanism coaxial with the drive gear and having an input member connected to the drive gear, a first output member connected to the front wheel side power transmitting mechanism, and a second output member connected to the rear wheel side power transmitting mechanism; a front differential gear coaxial with the center differential mechanism and connected to the first output member of the center differential mechanism; a power converting gear mechanism for converting a rotation about a first axis to a rotation about a second axis being perpendicular to the first axis to transmit power to the rear side power transmitting mechanism, having an input gear coaxial with the center differential mechanism and connected to the second output member of the center differential mechanism; and a hydraulic friction clutch mechanism arranged coaxially with the center differential mechanism to selectively lock the center differential mechanism.

4 Claims, 4 Drawing Sheets

FOUR-WHEEL DRIVE VEHICLE

This is a division of application Ser. No. 813,003 filed Dec. 24, 1985, now U.S. Pat. No. 4,763,749.

BACKGROUND OF THE INVENTION

This invention relates to a transversal engine four-wheel drive vehicle.

Generally, there is created rotational speed difference accompanied by difference in a turning radius between front wheels and rear wheels in turning of a four-wheel vehicle. When a four-wheel drive vehicle is turned on a road surface having a high coefficient of friction such as a paved road where slippage between the road surface and drive wheels is seldom created, there is disadvantageously generated a return torque (rotational difference of the drive shafts) between the front wheel drive shaft and the rear wheel drive shaft. For this reason, it is generally prevented that drivability is impaired, that wear of a tire is increased, and that durability is deteriorated. The four-wheel drive vehicle is classified into a part-time type adapted to switch from four-wheel drive to two-wheel drive on the road surface having a high coefficient of friction such as the paved road and a full-time type (normally four-wheel drive conditioned) having a center differential mechanism for dividedly transmitting power to the front wheel drive shaft and the rear wheel drive shaft.

The conventional full-time four-wheel drive vehicle having a transversal engine is provided with a front wheel differential gear for dividedly transmitting the power to a front right wheel and a front left wheel, a rear wheel differential gear for dividedly transmitting the power to a rear right wheel and a rear left wheel, and the center differential mechanism. Therefore, if only one of the drive wheels is separated from the road surface or slips, that is, negative load is removed, the divided power is not disadvantageously transmitted to the other three drive wheels. To solve the problem, the center differential mechanism of the conventional full-time four-wheel drive vehicle includes a differential locking mechanism for locking a differential mechanism of the center differential mechanism by a mechanical operating means (which is designed to generate differential resistance in a friction mechanism with the aid of a cam mechanism or a spring force) to be operated by increased output difference of torque transmitted to the front wheel drive shaft and the rear wheel drive shaft, and limiting the torque to be transmitted to the front wheel drive shaft and the rear wheel drive shaft, whereby the power may be transmitted to the other three wheels even if only one of the drive wheels is separated from the road surface.

However, in the conventional full-time four-wheel drive vehicle having a transversal engine, as the differential locking mechanism for locking the differential mechanism of the center differential is mechanically operable by the increased output difference in the torque to be transmitted to the front wheel drive shaft and the rear wheel drive shaft, there are the following problems in the prior art:

(1) The differential gear cannot be arbitrarily locked.

(2) It is difficult to set an initial timing of differential locking in the mechanical differential locking mechanism.

(3) The initial timing of differential locking cannot be made variable according to a vehicle running condition.

SUMMARY OF THE INVENTION

Accordingly, it is an object of the present invention to provide a four-wheel drive vehicle which may easily control operation of the differential mechanism of the center differential in a transversal engine mounted vehicle.

According to the present invention, there is provided a four-wheel drive vehicle comprising an engine having an output shaft extending in a transverse direction of a vehicular body, a transmission having an input shaft connected to the output shaft of the engine and an output shaft connected through a transmission mechanism to the input shaft in such a manner as to extend in a transverse direction of the vehicular body, and a center differential connected to the output shaft of the transmission for dividedly transmitting power to a front wheel side power transmitting mechanism and a rear wheel side power transmitting mechanism, wherein the center differential is provided with a hydraulic friction clutch mechanism for locking and unlocking a differential mechanism of the center differential.

DESCRIPTION OF THE PREFERRED EMBODIMENTS

Figure 1:
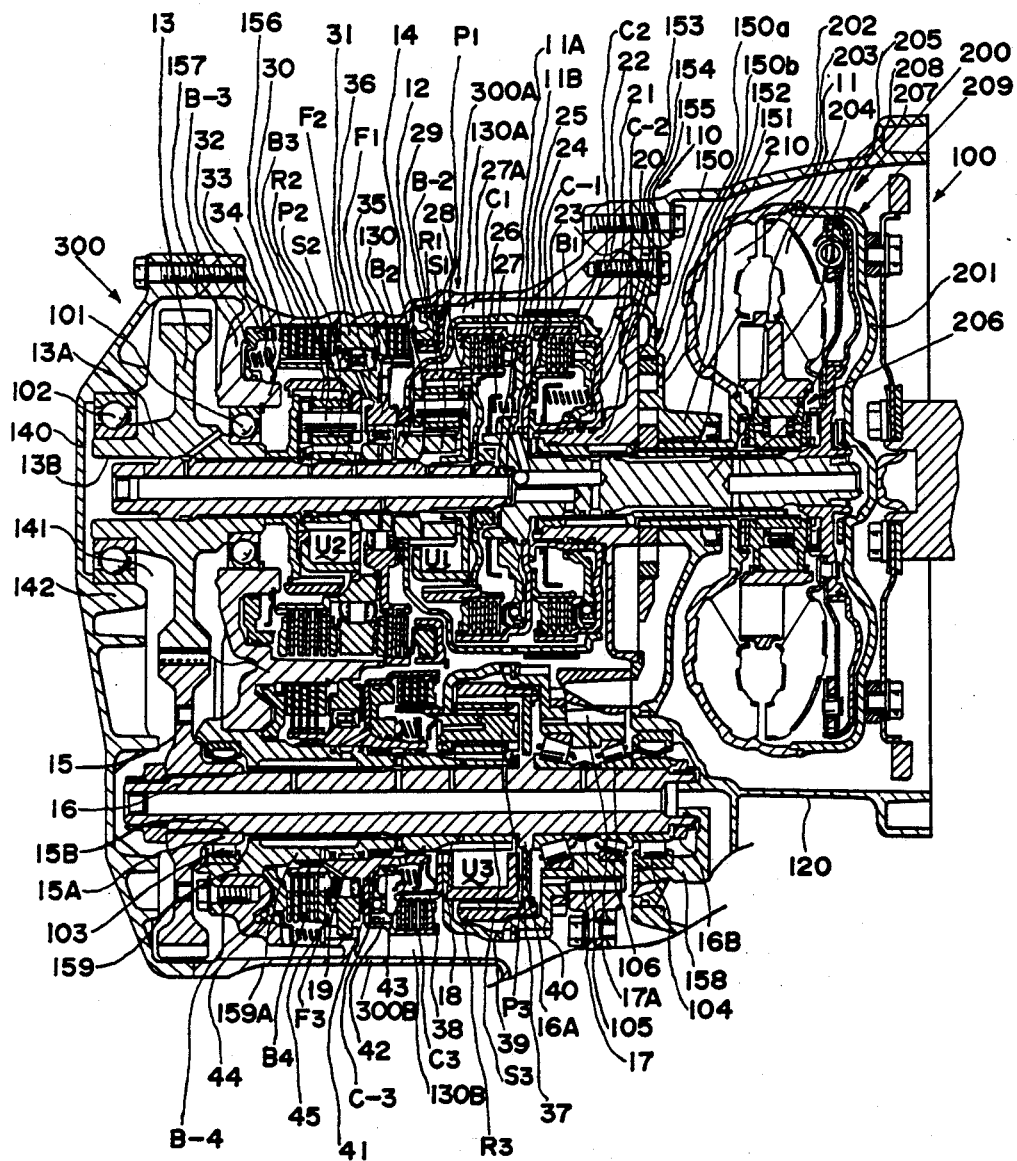
FIGS. 1 and 2 are sectional views of an automatic transmission to be mounted to a transversal engine in a first preferred embodiment of the present invention.
Figure 2:
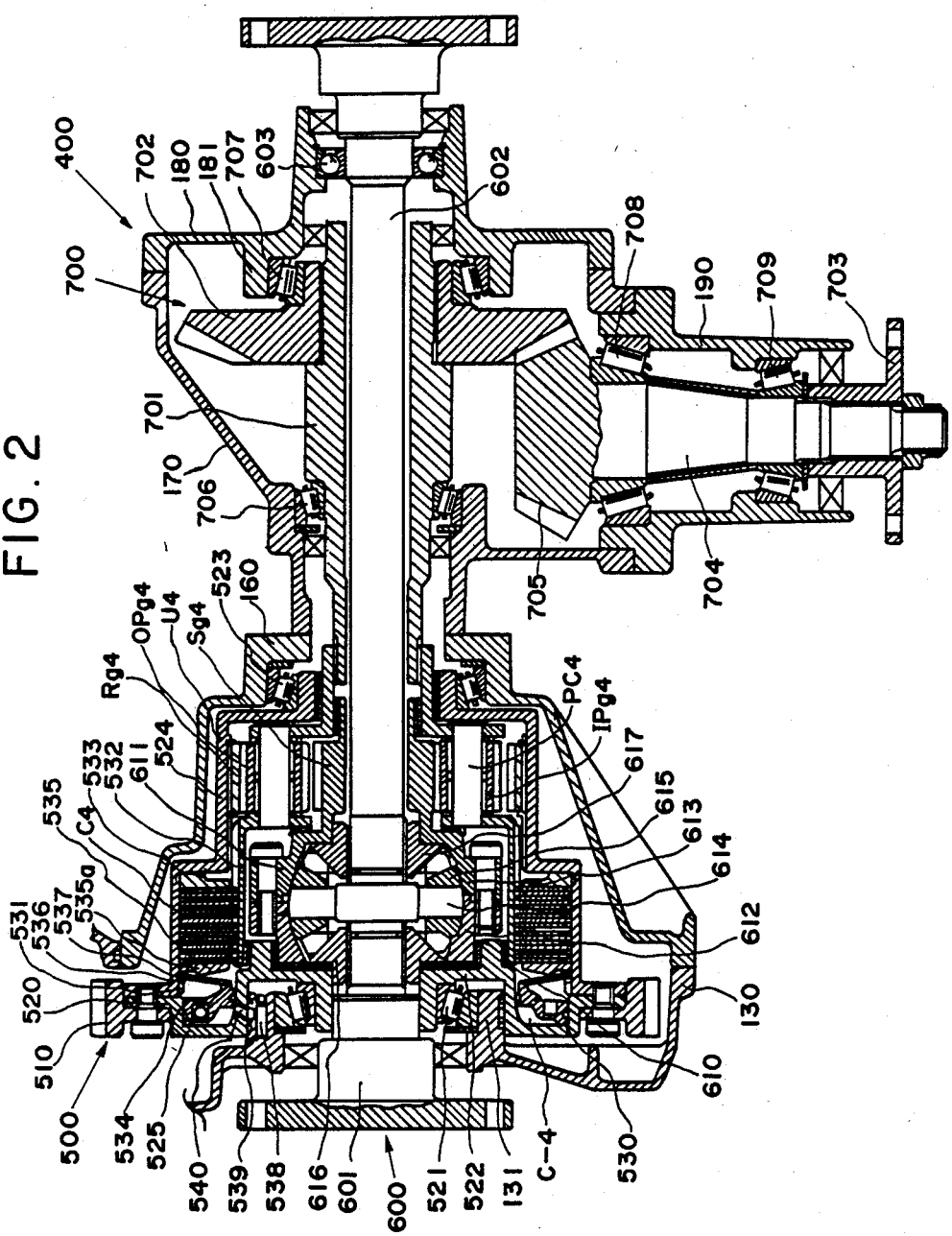

FIGS. 1 and 2 show an automatic transmission in section for four-wheel drive of a front transversal engine full-time type according to a first embodiment of the present invention.

An automatic transmission 100 comprises a fluid torque converter 200, transmission 300, transfer 400 for four-wheel drive and hydraulic control device (not shown) fixedly provided in an oil pan under the transmission 300.

The transmission 300 comprises an under-drive transmission 300A of three-forward and one-reverse range including a first planetary gear U1, second planetary gear U2, two multi-plate clutches C1 and C2 to be operated by a hydraulic servo, band brake B1, two multi-plate brakes B2 and B3, one-way clutch F1 and one-way brake F2, and an auxiliary transmission 300B including a third planetary gear U3, multi-plate clutch C3 to be operated by a hydraulic servo, multi-plate brake B4 and one-way brake F3.

A transmission case 110 of the automatic transmission 100 is constituted of plural separate members which are tightly fixed to each other.

The torque converter 200 is accommodated in a transmission case 120 opened at its right portion (on a right-hand side in the drawing), and is provided with a front cover 201 to be rotated by receiving a drive force of a crank shaft 1 as an output shaft of an engine (not shown), an annular plate-like rear cover 202 welded to an inner circumference of the front cover 201, a pump impeller 203 installed to an inner wall on an inner circumferential surface of the rear cover 202, a turbine runner 204 arranged in opposition to the pump impeller 203, a turbine shell 205 for retaining the turbine runner 204, a stator 208 supported through a one-way clutch 206 to a fixed shaft 207 connected to the transmission case 110 for increasing a torque capacity when an input rotational speed is low, and a direct connecting clutch (lockup clutch) 209 arranged between the front cover 201 and the turbine shell 205 for allowing simultaneous rotation of the front cover 201 and the turbine shell 205. An internal gear oil pump 150 having an external gear 150a and an internal gear 150b therein is provided between a cylindrical transmission case 130 extending at a left portion (on a left-hand side in the drawing) of the torque converter case 120 and the torque converter housing 120. An oil pump body 152 having a cylindrical portion 151 rightwardly projecting at an inner circumference thereof is fixed to a right portion of the transmission case 130 housing the transmission 300. An extension member 210 connected to an inner circumferential end of the rear cover 202 is engaged by spline through an inner circumference of the cylindrical portion 151 with an inner circumference of the external gear 150a. An oil pump cover 154 having a rearwardly projecting cylindrical front support 153 coaxial with the cylindrical portion 151 is fixed to a left portion of the oil pump body 152. Thusly, the oil pump body 152 and the oil pump cover 154 form a partition wall 155 between the torque converter case 120 and the transmission case 130. There are defined an under-drive mechanism chamber 130A housing the under-drive transmission 300A in an upper half space of the transmission case 130 and an auxiliary transmission mechanism chamber 130B housing the auxiliary transmission 300B in a lower half space thereof. At a left portion of the under-drive mechanism chamber 130A, there is provided a fixing member 157 made of aluminum alloy which member having a rightwardly projecting cylindrical center support 156 and supporting an output gear 13, thus defining an output gear housing 141 of the transmission between the fixing member 157 and a rear cover 140 bolted from the left of the transmission case 130. The rear cover 140 is formed with a rightwardly projected cylindrical rear support coaxial with the front support 153.

At a right central portion of the cylindrical auxiliary transmission mechanism chamber 130B provided in parallel relation with the cylindrical under-drive mechanism chamber 130A, a hole-like front support 158 is mounted to the torque converter case 120. At a left portion of the auxiliary transmission mechanism chamber 130B, a fixing member 159 having a rightwardly projecting cylindrical inner member 159A is fixed to the transmission case 130 by a bolt.

The fixed shaft 207 of the one-way clutch 206 for supporting the stator 208 of the torque converter 200 is fitted inside of the front support 153, and an input shaft 11 of the transmission 300 as an output shaft of the torque converter 200 is rotatably supported inside of the fixed shaft 207. The input shaft 11 is formed with a large diametrical left end portion 11A leftwardly projecting from the front support 153, and the left end portion 11A is formed with a leftward hole 11B at a center thereof. A first intermediate transmitting shaft 12 arranged in a serial manner with respect to the input shaft 11 is rotatably mounted to a left portion of the input shaft 11. The first intermediate transmitting shaft 12 is in sliding contact with the hole 10B at a right end portion thereof, and is engaged by spline with an inner hole 13B of a central cylindrical portion 13A of the output gear 13 at a left end thereof. The cylindrical portion 13A of the output gear 13 is supported by ball bearings 101 and 102 for allowing smooth rotation of the output gear 13 which bearings are provided between the center support 156 and the rear support 142 of the fixing member 157 and the cylindrical portion 13A of the output gear 13. A sun gear shaft 14 is rotatably engaged through a bearing with an outside of a right end of the first intermediate transmitting shaft 12.

An input gear 15 of the auxiliary transmission 300B to be meshed with the output gear 13 is supported through a roller bearing 103 to the inner member 159A at a central cylindrical portion 15A thereof. A second intermediate transmitting shaft 16 centrally passing through the auxiliary transmission mechanism chamber 130B is engaged by spline at a left end portion thereof with the inner hole 15B. The second intermediate transmitting shaft 16 is formed with a flange-like projection 16A at an intermediate portion thereof, and is rotatably supported through a roller bearing 104 to the hole-like front support 158 at a right end portion thereof. There is formed between the roller bearing 104 and the flange-like projection 16A on the second intermediate transmitting shaft 16 an output gear 17A of a double-shaft automatic transmission (a multi-range transmission comprising the under-drive transmission 300A and the auxiliary transmission 300B) through a pair of tapered roller bearings 106 installed under adjusted prepressure with a spring member 105 interposed and a nut 16B fastened at one end, and an output shaft 17 of the transmission 300 is supported. An output gear 17A of the output shaft 17 is meshed with a drive gear wheel 501 of the transfer 400.

A cylindrical sun gear shaft 18 is rotatably supported through a bushing between the flange-like projection 16A on the second intermediate transmitting shaft 16 and the inner member 159A. A cylindrical outer member 19 is rotatably supported through a bushing on the outside of the inner member 159A. An outside of a left end of the sun gear shft 18 is engaged by spline with an inside of a right end of the outer member 19.

In the under-drive mechanism chamber 130A, at the right side thereof, a first hydraulic servo drum 20 opened at its left portion is rotatably engaged with the front support 153, and an annular piston 21 is fitted between inner and outer circumferential walls thereof to form a hydraulic servo C-2 of the clutch C2. A return spring 22 is mounted to the inner wall side of the servo drum, while the clutch C2 is mounted to the inside of the outer wall thereof. On the left side of the first hydraulic servo drum 20, a second hydraulic servo drum 24 opened at its left portion and having an annular projection 23 at its right portion is fixed to the left end portion 11A of the input shaft 11, and an annular piston 25 is fitted between the left end portion 11A and an outer wall of the servo drum to form a hydraulic servo C-1 of the clutch C1. A return spring 26 is mounted on the inner circumferential side of the servo drum, while the clutch C1 is mounted to the inside of the outer wall thereof. Further, the clutch C2 is mounted to the outer circumference of the annular projection 23, and both the first and second hydraulic servo drums 20 and 24 are connected through the clutch C2 with each other. On the left side of the second hydraulic servo drum 24, the first planetary gear U1 is provided, and a ring gear R1 is connected through the clutch C1 to the second hydraulic servo drum 24. A carrier P1 is engaged by spline with a right end portion of the first intermediate transmitting shaft 12, and a sun gear S1 is integrally formed with the sun gear shaft 14. A connecting drum 27 so molded as to cover the first and second hydraulic servo drums 20 and 24 and the first planetary gear U1 in a minimum space is fixed to the outside of the first hydraulic servo drum 20 at a right end thereof, and is connected to the sun gear shaft 14 at a left end thereof on the left side of the first planetary gear U1. Further, the band brake B1 is provided on the outer circumferential side of the servo drum.

In an excess space 27A outside of the connecting drum 27 outside of the first planetary gear U1, an annular third hydraulic servo drum 28 opened at its left portion is fixed, and a piston 29 is fitted to form a hydraulic servo B-2 of the brake B2. The brake B2, an outer race 31 of the one-way brake F2 and the multi-plate brake B3 are engaged in this order from the right with a spline groove 30 formed on the inside of the transmission case 130 on the left side of the hydraulic servo B-2. A piston 32 is fitted in an annular hole defined between the outer circumference of the center support 156 of the fixing member 157 and the torque converter 200 to form a hydraulic servo B-3 of the multi-plate brake B3. A return spring 33 of the hydraulic servo B-3 is supported by a flange plate 34 mounted at the right end of the center support 156. The one-way clutch F1 including the sun gear shaft 14 as an inner race is provided inside of the multi-plate brake B2, and an outer race 35 is connected with an inner circumference of the multi-plate brake B2. The second planetary gear U2 is provided on the left side of the one-way clutch F1. In the second planetary gear U2, a sun gear S2 is integrally formed with the sun gear shaft 14. A carrier P2 is connected with an inner race 35A of the one-way brake F2 and with the multi-plate brake B3. A ring gear R2 is connected with the first intermediate transmitting shaft 12.

In the third planetary gear U3 provided on the left side of the output shaft 17, a ring gear R3 is connected through a flange plate 37 to the projection 16A of the second intermediate transmitting shaft 16. A carrier P3 is connected through an output drum 39 having an annular projection 38 to be connected with the clutch C3 to a connecting sleeve 40 as an input section. A sun gear S3 is formed on a sun gear shaft 18. On the left side of the third planetary gear U3, a fourth hydraulic servo drum 41 opened at its right portion is fixed to the outer member 19 rotatably mounted through a bearing to the outer circumference of the inner member 159A of the fixing member 159. An annular piston 42 is fitted between an outer wall of the servo drum 41 and the outer member 19 to form a hydraulic servo C-3 of the clutch C3. A return spring 43 is installed on the outer member 19 side, and the clutch C3 is mounted inside of the outer wall. The servo drum 41 is connected through the clutch C3 to the carrier P3. The one-way brake F3 including an inner race of the outer member 19 is provided on the left side of the fourth hydraulic servo drum 41. On the left side of the servo drum, the brake B4 is provided between the outer member 19 and the transmission case 130. A piston 44 is fitted between the outer circumference of the inner member 159A of the fixing member 159 and the transmission case 130 to form a hydraulic servo B-4 of the brake B4. A return spring 45 is fitted in a groove formed on the outer circumferential side of the brake B4. The outer member 19 is rotated by receiving power through the carrier P3 of the third planetary gear U3, the output drum 39 and the clutch C3.

The transmission 300 is designed to effect engagement or release of each clutch and brake by hydraulic pressure selectively outputted from the hydraulic control device (not shown) to each hydraulic servo of frictional engagement devices according to running conditions of a vehicle such as a vehicular speed and a degree of throttle opening, thereby obtaining four forward ranges and one reverse range. There will be shown in Table 1 an example of operation and transmission range of each clutch, brake, one-way clutch and one-way brake.

(TABLE 1)

| RANGE | | CLUTCH $C_1C_2C_3$ | BRAKE $B_1B_2B_3B_4$ | OWC $F_1F_2F_3$ |
|---|---|---|---|---|
| P | | xxx | xxxE | f f f |
| R | | xEx | xxEE | f f f |
| N | | xxx | xxxE | f f f |
| D | 1 | Exx | xxxE | f L (L) |
|   | 2 | Exx | xExE | L f (L) |
|   | 3 | EEx | xExE | f f (L) |
|   | 4 | EEE | xExx | f f f |
| S | 1 | Exx | xxxE | f L (L) |
|   | 2 | Exx | EExE | (L) f (L) |
|   | 3 | EEx | xExE | f f (L) |
|   | (3) | EEx | xExE | f f (L) |
| L | 1 | Exx | xxEE | f (L) (L) |
|   | 2 | Exx | EExE | (L) f (L) |
|   | (1) | Exx | xxEE | f (L) (L) |

In Table 1, E represents that the corresponding clutch and brake are engaged, and X represents that the corresponding clutch and brake are released. L represents that the corresponding one-way clutch is engaged under engine drive condition, but such engagement is not necessarily needed because of the fact that power transmission is ensured by the clutch or brake arranged in parallel to the one-way clutch (Lock condition). (L) represents that the corresponding one-way clutch is engaged only under engine drive condition, but is not engaged under engine brake condition. Further, f represents that the corresponding one-way clutch is free.

The transfer 400 comprises a center differential mechanism 500 applying the fourth planetary gear U4 which employs a dual planetary gear set as a differential gear for dividing and transmitting a power to a front wheel side and a rear wheel side, and is provided with a hydraulic clutch mechanism 530 for locking and unlocking the fourth planetary gear U4 as the differential gear, a front wheel side power transmitting mechanism 600 adapted to be driven by a power transmitted from the center differential mechanism 500 and having a bevel gear type front differential gear 610 for driving front wheels, and a rear wheel side power transmitting mechanism 700 for receiving the power from the center differential mechanism 500 and converting a rotational direction to transmit the power to the rear wheel side.

The center differential mechanism 500 comprises a drive gear wheel 510 meshing with the output gear 17A of the output shaft 17 of the transmission 300 and receiving power from the output shaft 17; a center differential case 520 composed of a left case 522 rotatably supported through a tapered roller bearing 521 on an inner circumference of a rightwardly projecting sleeve-like portion 131 coaxial with the front wheel side power transmitting mechanism 600 of the transmission case 130 and a right case 524 rotatably supported through a tapered roller bearing 523 on an inner circumference of a transfer case 160 housing a right portion of the center differential mechanism 500 fixed to the right portion of the transmission case 130, the center differential case 520 being fixedly bolted to the drive gear wheel 510 and incorporating the front differential gear 610 of the front side power transmitting mechanism 600; a fourth planetary gear U4 comprising a ring gear Rg4 mounted at a right side position of the front differential gear 610 in the right case 524 of the center differential case 520, an outer pinion gear OPg4 meshed with the ring gear Rg4, an inner pinion gear IPg4 meshed with the outer pinion gear OPg4, a sun gear Sg4 meshed with the inner pinion gear IPg4, and a planetary carrier PC4 for rotatably supporting the outer pinion gear OPg4 and the inner pinion gear IPg4; and a hydraulic clutch mechanism 530 comprising a multi-plate clutch C4 meshed with an inner spline 531 formed on an inner circumference at an outer circumferential position of the front differential gear 610 in the right case 524 of the center differential case 520 and with an outer spline 533 formed on an outer circumference of an annular projection 532 at an outer circumferential position of the front differential gear 610 on the left of the planetary carrier PC4 of the fourth planetary gear U4, a piston 534 fitted airtight in an annular hole 525 defined at a position of the left case 522 on the transmission 300 side of the multi-plate clutch C4 so as to urge the multi-plate clutch U4, a hydraulic servo C-4 provided between the annular hole 525 and the piston 534 for driving the piston 534 by supplying and discharging a hydraulic oil, a clutch push plate 535 provided between the multi-plate clutch C4 and the piston 534 and having a fulcrum 535a projecting to the piston 534 on the multi-plate clutch C4 side, and a lever type return spring 537 abutting against the piston 534 at its inner position, abutting against the fulcrum 535a of the clutch push plate 535 at its intermediate position, and being stopped by a snap ring 536 at its outer position. Supply/discharge control of the hydraulic oil to the hydraulic servo C-4 is effected by a hydraulic control device (not shown) provided at a lower portion of the transmission 300. A hydraulic oil supply means for supplying the hydraulic oil from the hydraulic control device to the hydraulic servo C-4 is formed by an oil passage (not shown) in the transmission case 130 from the hydraulic control device, an oil passage 538 in the sleeve-like portion 131 from the oil passage in the transmission case 130, an oil passage 539 in the sleeve-like portion 131 for communicating the oil passage 538 with an outer circumference of the sleeve-like portion 131, and an oil passage 540 in the left case 522 for communicating the oil passage 539 with the hydraulic servo C-4. The multi-plate clutch C4 is engaged by supplying the hydraulic oil to the hydraulic servo C-4 thereby to transmit an output of the output shaft 17 of the transmission 300 through the drive gear wheel 510, the center differential case 520 and the multi-plate clutch C4 to the annular projection 532. As a result, the ring gear Rg4 mounted to the center differential case 520 is synchronously rotated with the planetary carrier PC4, and the fourth planetary gear U4 as the differential gear is locked. Such engagement of the multi-plate clutch C4 is released by discharging the hydraulic oil of the hydraulic servo C-4, and the power transmitted to the right case 524 is transmitted to the ring gear Rg4 of the fourth planetary gear U4, while the power transmitted to the ring gear Rg4 is dividedly transmitted through the inner pinion gear IPg4 and the outer pinion gear OPg4 to the sun gear Sg4 and the planetary carrier PC4.

The above-mentioned supply/discharge control of the hydraulic oil to the hydraulic servo C-4 by the hydraulic control device is effected by an arbitrary selection by an operator and an electronic control device (not shown) operable according to a running condition of the vehicle.

The front side power transmitting mechanism 600 includes a front differential gear 610 comprising a front differential case 613 composed of a left differential case 612 and a right differential case 613 integrally formed with the sun gear Sg4 of the fourth planetary gear U4 of the center differential mechanism 500 and bolted to the left differential case 612, a differential pinion shaft 614 supported to the front differential case 611, a differential pinion 615 rotatably supported to the differential pinion shaft 514, a differential left side gear 616 meshed with the differential pinion 615 at the left and a differential right side gear 617 meshed with the differential pinion 615 at the right. A front left wheel propeller shaft 601 for driving a front left wheel is engaged by spline with an inner circumference of the differential left side gear 616, while a front right wheel propeller shaft 602 for driving a front right wheel is engaged by spline with an inner circumference of the differential right side gear 617. Thusly, the power transmitted to the sun gear Sg4 is dividedly transmitted to the front left wheel propeller shaft 601 and the front right wheel propeller shaft 602 by the operation of the front differential gear 610.

The rear wheel side power transmitting mechanism 700 comprises a gear wheel shaft 701 having the front right wheel propeller shaft 602 of the front wheel side power transmitting mechanism 600 therein and connected by spline at the left end of its outer circumference with the right end of the inner circumference of the planetary carrier PC4 of the fourth planetary gear U4, a gear wheel 702 engaged by spline with the outer circumference of the right portion of the gear wheel shaft 701, and a pinion 705 meshed with the gear wheel 702 and integrally formed with a rear wheel propeller shaft 704 connected by spline with the outer circumference of a rear portion of a sleeve yoke 703 for transmitting power to the rear wheel side. The gear wheel shaft 701 is rotatably supported at its intermediate portion through a tapered roller bearing 706 to the inner circumference of a gear wheel case 170 fixed to the right side of the transfer case 160. A propeller shaft support case 180 is designed to rotatably support the front right wheel propeller shaft 602 fastened through a ball bearing 603 to the right side of the gear wheel case 170. The gear wheel shaft 701 is rotatably supported at its right portion through a tapered roller bearing 707 and the gear wheel 702. The tapered roller bearing 707 is provided on the inner circumference of a cylindrical boss portion 181 of the support case 180 which is leftwardly projected and is coaxial with the front right wheel propeller shaft 602. The rear wheel propeller shaft 704 is rotatably supported through tapered roller bearings 708 and 709 to the inner circumference of a pinion case 190 fastened to the rear portion of the gear wheel case 170. Thus, the power transmitted to the planetary carrier PC4 is transmitted through the gear wheel shaft 701, gear wheel 702, pinion 705, rear wheel propeller shaft 704 and sleeve yoke 703 to a rear drive wheel side.

As mentioned above, since the multi-plate clutch is provided at the outer circumferential position of the differential gear, a friction area of the multi-plate clutch may be increased, and therefore a clutch capacity may be increased to allow the multi-plate clutch to be adapted to a vehicle having a large cylinder capacity. Further, an axial dimension of the transfer may be reduced. A torque ratio may be equally distributed to the front wheel side power transmitting mechanism and the rear wheel side power transmitting mechanism by using the dual planetary gear set for the differential gear of the center differential mechanism. As the hydraulic friction clutch is provided in the center differential case, the transfer may be made compact thereby to improve installability to the vehicle. The oil passages for supplying and discharging the hydraulic oil may be shortened by providing the hydraulic chamber (hydraulic servo) of the hydraulic friction clutch on the hydraulic control device side of the frictional engagement member (multi-plate clutch), thereby simplifying the hydraulic oil supply means. A large engagement torque capacity may be obtained with a small space by using the lever type return spring as the friction engagement means.

Figure 3:
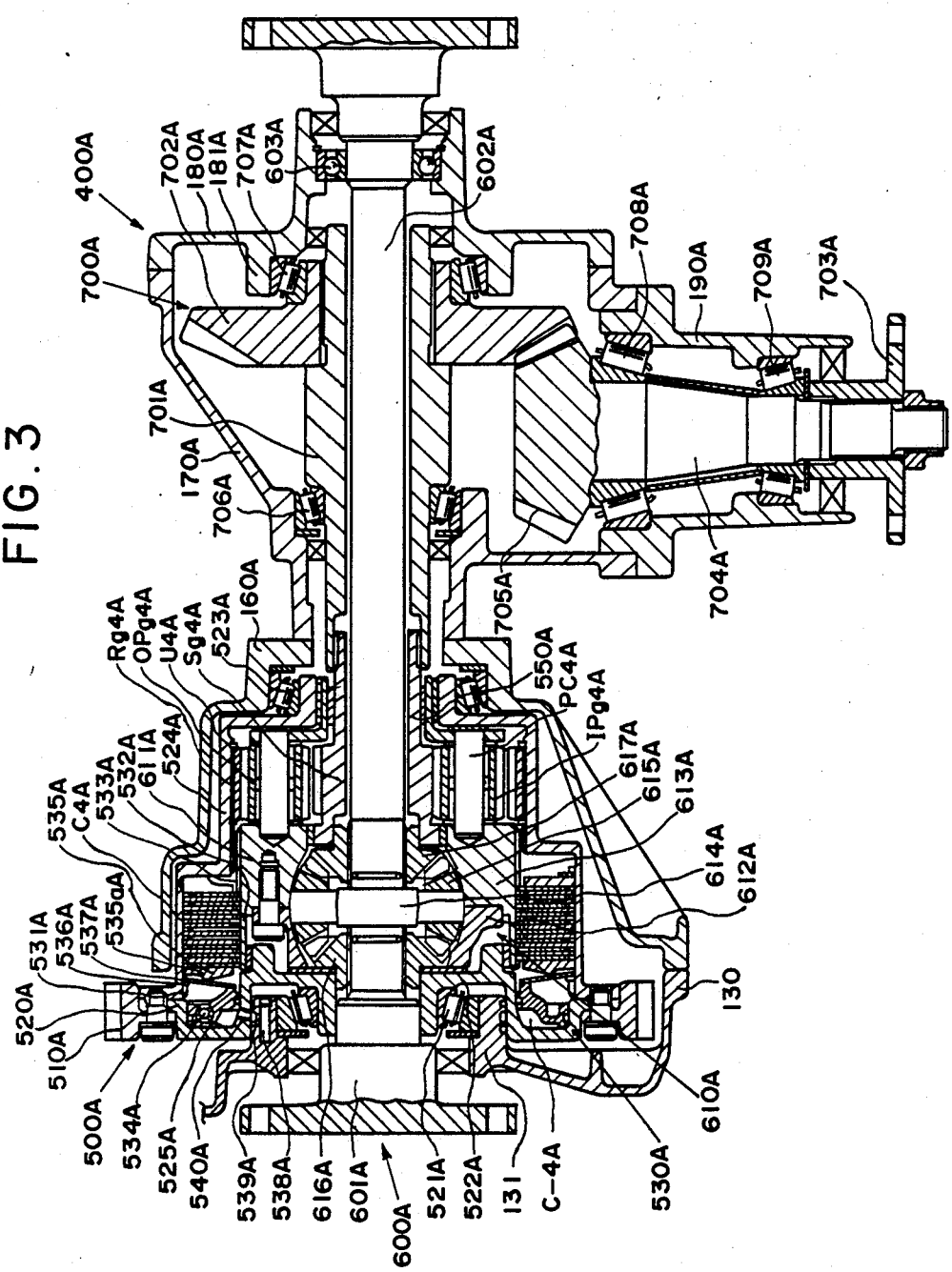
FIG. 3 is a sectional view of a transfer in a second preferred embodiment of the present invention.

FIG. 3 is a sectional view of a transfer of the automatic transmission in the second preferred embodiment of the present invention.

The transfer 400A comprises a center differential mechanism 500A applying the fourth planetary gear U4A which employs a dual planetary gear set as a differential gear for dividing and transmitting a power to a front wheel side and a rear wheel side, and is provided with a hydraulic clutch mechanism 530A for locking and unlocking the fourth planetary gear U4A as the differential gear, a front wheel side power transmitting mechanism 600A adapted to be driven by a power transmitted from the center differential mechanism 500A and having a bevel gear type front differential gear 610A for driving front wheels, and a rear wheel side power transmitting mechanism 700A for receiving the power from the center differential mechanism 500A and converting a rotational direction to transmit the power to the rear wheel side.

The center differential mechanism 500A comprises a drive gear wheel 510A meshing with the output gear 17A of the output shaft 17 of the transmission 300 and receiving power from the output shaft 17; a center differential case 520A composed of a left case 522A rotatably supported through a tapered roller bearing 521A on an inner circumference of a rightwardly projecting sleeve-like portion 131 coaxial with the front wheel side power transmitting mechanism 600A of the transmission case 130 and a right case 524A rotatably supported through a tapered roller bearing 523A on an inner circumference of a transfer case 160A housing a right portion of the center differential mechanism 500A fixed to the right portion of the transmission case 130, the center differential case 520A being fixedly bolted to the drive gear wheel 510A and incorporating the front differential gear 610A of the front side power transmitting mechanism 600A; a fourth planetary gear U4A comprising a ring gear Rg4A mounted at a right side position of the front differential gear 610A in the right case 524A of the center differential case 520A, an outer pinion gear OPg4A meshed with the ring gear Rg4A, an inner pinion gear IPg4A meshed with the outer pinion gear OPg4A, a sun gear Sg4A meshed with the inner pinion gear IPg4A, and a planetary carrier PC4A for rotatably supporting the outer pinion gear OPg4A and the inner pinion gear IPg4A; and a hydraulic clutch mechanism 530A comprising a multi-plate clutch C4A meshed with an inner spline 531A formed on an inner circumference at an outer circumferential position of the front differential gear 610A in the right case 524A of the center differential case 520A and with an outer spline 533A formed on an outer circumference including an annular projection 532A formed on an outer circumference of the right differential case 613A of the front differential case 611A of the front differential gear 610A connected to the planetary carrier PC4A of the fourth planetary gear U4A, piston 534A air-tightly fitted in an annular hole 525A defined at a position of the left case 522A on the transmission 300 side of the multi-plate clutch C4A so as to urge the multi-plate clutch C4, a hydraulic servo C-4A provided between the annular hole 525A and the piston 534A for driving the piston 534A by supplying and discharging a hydraulic oil, a clutch push plate 535A provided between the multi-plate clutch C4A and the piston 534A and having a fulcrum 535aA projecting to the piston 534A on the multi-plate clutch C4A side, and a lever type return spring 537A abutting against the piston 534A at its inner position, abutting against the fulcrum 535aA of the clutch push plate 535A at its intermediate position, and being stopped by a snap ring 536A at its outer position. Supply/discharge control of the hydraulic oil to the hydraulic servo C-4A is effected by a hydraulic control device (not shown) provided at a lower portion of the transmission 300. A hydraulic oil supply means for supplying the hydraulic oil from the hydraulic control device to the hydraulic servo C-4A is formed by an oil passage (not shown) in the transmission case 130 from the hydraulic control device, an oil passage 538A in the sleeve-like portion 131 from the oil passage in the transmission case 130, an oil passage 539A in the sleeve-like portion 131 for communicating the oil passage 538A with an outer circumference of the sleeve-like portion 131, and an oil passage 540A in the left case 522A for communicating the oil passage 539A with the hydraulic servo C-4A. The multi-plate clutch C4A is engaged by supplying the hydraulic oil to the hydraulic servo C-4A thereby to transmit an output of the output shaft 17 of the transmission 300 through the drive gear wheel 510A, the center differential case 520A and the multi-plate clutch C4A to the annular projection 532A. As a result, the ring gear Rg4A mounted in the right case 524A of the center differential case 520A is synchronously rotated with the planetary carrier PC4A rotatably supporting the outer pinion gear OPg4A meshed with the ring gear Rg4A and the inner pinion gear IPg4A meshed with the outer pinion gear OPg4A, and the fourth planetary gear U4A as the differential gear is locked. Such engagement of the multi-plate clutch C4A is released by discharging the hydraulic oil of the hydraulic servo C-4A, and the power transmitted to the right case 524A is transmitted to the ring gear Rg4A of the fourth planetary gear U4A, while the power transmitted to the ring gear Rg4A is dividedly transmitted through the inner pinion gear IPg4A and the outer pinion gear OPg4A to the sun gear Sg4A and the planetary carrier PC4A.

The front side power transmitting mechanism 600A includes a front differential gear 610A comprising a front differential case 613A composed of a left differential case 612A connected to the planetary carrier PC4A of the fourth planetary gear U4A of the center differential mechanism 500A and a right differential case 613A and bolted to the left differential case 612A, a differential pinion shaft 614A supported to the front differential case 611A, a differential pinion 615A rotatably supported to the differential pinion shaft 514A, a differential left side gear 616A meshed with the differential pinion 615A at the left and a differential right side gear 617A meshed with the differential pinion 615A at the right. A front left wheel propeller shaft 601A for driving a front left wheel is engaged by spline with an inner circumference of the differential left side gear 616A, while a front right wheel propeller shaft 602A for driving a front right wheel is engaged by spline with an inner circumference of the differential right side gear 617A. Thusly, the power transmitted to the planetary carrier PC4A and the right differential case 613A is dividedly transmitted to the front left wheel propeller shaft 601A and the front right wheel propeller shaft 602A by the operation of the front differential gear 610A.

The rear wheel side power transmitting mechanism 700A comprises a gear wheel shaft 701A having the front right wheel propeller shaft 602A of the front wheel side power transmitting mechanism 600A therein and connected by spline at the left end of its outer circumference with the right end of the inner circumference of the sun gear shaft 550A rotatably supporting the sun gear Sg4A of the fourth planetary gear U4A, a gear wheel 702A engaged by spline with the outer circumference of the right portion of the gear wheel shaft 701A, and a pinion 705A meshed with the gear wheel 702A and integrally formed with a rear wheel propeller shaft 704A connected by spline with the outer circumference of a rear portion of a sleeve yoke 703A for transmitting power to the rear wheel side. The gear wheel shaft 701A is rotatably supported at its intermediate portion through a tapered roller bearing 706A to the inner circumference of a gear wheel case 170A fixed to the right side of the transfer case 160A. A propeller shaft support case 180A is designed to rotatably support the front right wheel propeller shaft 602A fastened through a ball bearing 603A to the right side of the gear wheel case 170A. The gear wheel shaft 701A is rotatably supported at its right portion through a tapered roller bearing 707A and the gear wheel 702A. The tapered roller bearing 707A is provided on the inner circumference of a cylindrical boss portion 181A of the support case 180A which is leftwardly projected and is coaxial with the front right wheel propeller shaft 602A. The rear wheel propeller shaft 704A is rotatably supported through tapered roller bearings 708A and 709A to the inner circumference of a pinion case 190A fastened to the rear portion of the gear wheel case 170A. Thus, the power transmitted to the sun gear Sg4A of the fourth planetary gear U4A is transmitted through the sun gear shaft 550A, gear wheel shaft 701A, gear wheel 702A, pinion 705A, rear wheel propeller shaft 704A and sleeve yoke 703A to a rear drive wheel side.

Figure 4:
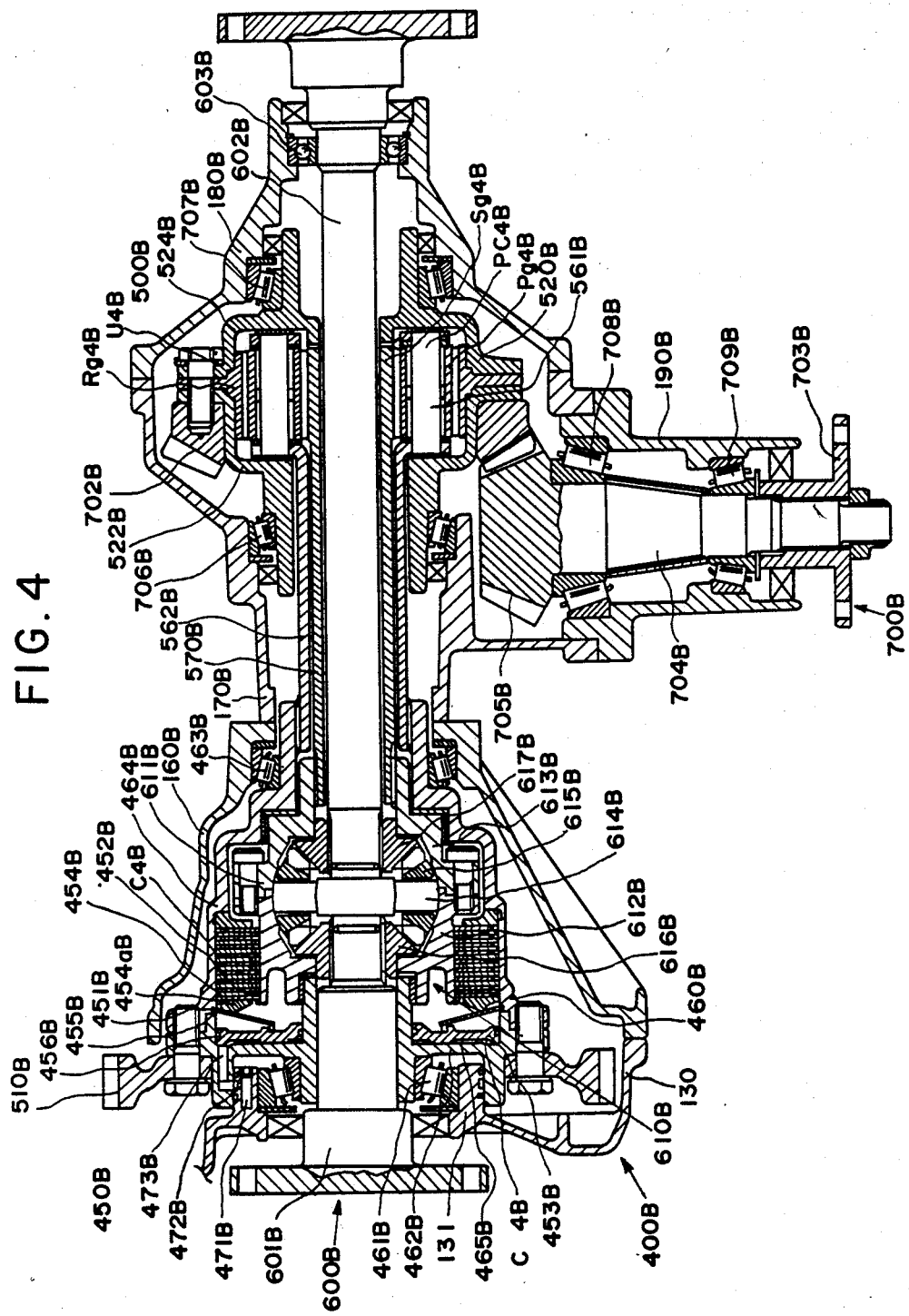
FIG. 4 is a sectional view of a transfer in a third preferred embodiment of the present invention.

FIG. 4 is a sectional view of a transfer of the automatic transmission in the third preferred embodiment of the present invention.

The transfer 400B comprises a center differential mechanism 500B applying the fourth planetary gear U4B which employs a single type planetary gear set as a differential gear for dividing and transmitting a power to a front wheel side and a rear wheel side, a hydraulic clutch mechanism 450B provided independently of the center differential mechanism 500B for locking and unlocking the fourth planetary gear U4B as the differential gear of the center differential mechanism 500B, a front wheel side power transmitting mechanism 600B adapted to be driven by a power transmitted from the center differential mechanism 500B and having a bevel gear type front differential gear 610B for driving front wheels, and a rear wheel side power transmitting mechanism 700B for receiving the power from the center differential mechanism 500B and converting a rotational direction to transmit the power to the rear wheel side.

The hydraulic clutch mechanism 450B comprises a differential gear case 460B composed of a left case 462B for transmitting power to the center differential mechanism 500B and incorporating a front differential gear 610B of the front wheel side power transmitting mechanism 600B, which left case is rotatably supported through a tapered roller bearing 461B on an inner circumference of a rightwardly projecting sleeve-like portion 131 coaxial with the front wheel side power transmitting mechanism 600B of the transmittion case 130 and a right case 464B rotatably supported through a tapered roller bearing 463B on an inner circumference of a transfer case 160B housing a right portion of the hydraulic clutch mechanism 450B fixed to the right portion of the transmission case 130, the differential gear case being fixedly bolted to a drive gear wheel 510B meshed with the output gear 17A of the output shaft 17 of the transmission 300 for receiving the power transmitted from the transmission 300; a multi-plate clutch C4B meshed with an outer spline 451B formed on an inner circumference at a side position on the transmission 300 side of the front differential gear 610B of the right case 464B of the differential gear case 460B and with an outer spline 452B formed on an outer circumference of the left case 612B of the front differential case 611B of the front differential gear 610B; a piston 453B fitted airtight in an annular hole 465B defined at a position of the left case 462B on the transmission 300 side of the multi-plate clutch C4B, so as to urge the multi-plate clutch C4B; a hydraulic servo C-4B provided between the annular hole 465B and the piston 453B for driving the piston 453B by supplying and discharging a hydraulic oil; a clutch push plate 454B provided between the multi-plate clutch C4B and the piston 453B and having a fulcrum 454aB projecting to the piston 453B side at an intermediate position on the multi-plate clutch C4B; and a lever type return spring 456B abutting against the piston 453B at its inner position, abutting against the fulcrum 454aB of the clutch push plate 454B at its intermediate position, and being stopped by an outer circumferential groove 455B defined at its outer position on an inner circumference of a connected portion between the left case 462B and the right case 464B. Supply/discharge control of the hydraulic oil to the hydraulic servo C-4B is effected by a hydraulic control device (not shown) provided at a lower portion of the transmission 300. A hydraulic oil supply means for supplying the hydraulic oil from the hydraulic control device to the hydraulic servo C-4B is formed by an oil passage (not shown) in the transmission case 130 from the hydraulic control device, an oil passage 471B in the sleeve-like portion 131 from the oil passage in the transmission case 130, an oil passage 472B in the sleeve-like portion 131 for communicating the oil passage 471B with an outer circumference of the sleeve-like portion 131, and an oil passage 473B in the left case 522B for communicating the oil passage 472B with the hydraulic servo C-4B.

The center differential mechanism 500B comprises a center differential case 520B composed of a left case 522B rotatably supported through a tapered roller bearing 706B on an inner circumference of a gear wheel case 170B fixed to the right side of the transfer case 160B on its left side and housing the left side of the fourth planetary gear U4B in its right portion, and a right case 524B fixed to the right portion of the gear wheel case 170B on its right side and rotatably supported through a tapered roller bearing 707B on an inner circumference of a propeller shaft support case 180B for rotatably supporting a front right wheel propeller shaft 602B through a ball bearing 603B and housing the right side of the fourth planetary gear U4B in its left portion, the center differential case 520B being fixedly bolted to a gear wheel 702B of the rear wheel side power transmitting mechanism 700B and a ring gear Rg4B of the fourth planetary gear U4B. The fourth planetary gear U4B comprises a pinion gear Pg4B meshed with the ring gear Rg4B mounted to the center differential case 520B, a sun gear Sg4B meshed with the pinion gear Pg4B, and a planetary carrier PC4B for rotatably supporting the pinion gear Pg4B. The planetary carrier PC4B comprises a pinion shaft 561B for rotatably supporting the pinion gear Pg4B and a shaft support member 562B for supporting the pinion shaft 561B. The shaft support member 562B is leftwardly extended and is connected by spline with an inner circumference at the right end of the differential gear case 460B. The sun gear Sg4B is formed integrally with a sun gear shaft 570B connected by spline with an inner circumference at the right end of the right case 613B of the front differential case 611B of the front differential gear 610B.

The multi-plate clutch C4B is engaged by supplying a hydraulic oil to the hydraulic servo C-4B of the hydraulic clutch mechanism 450B thereby to synchronously rotate the differential gear case 460B and the front differential case 611B. As a result, the planetary carrier PC4B and the sun gear Sg4B are synchronously rotated through the shaft support member 562B and the sun gear shaft 570B, and the fourth planetary gear U4B as the differential gear is locked. Such engagement of the multi-plate clutch C4B is released by discharging the hydraulic oil from the hydraulic servo C-4B, and the power transmitted to the differential gear case 460B is transmitted through the shaft support member 562B to the planetary carrier PC4B of the fourth planetary gear U4B, while the power transmitted to the planetary carrier PC4B is dividedly transmitted through the pinion gear Pg4B to the sun gear Sg4B and the ring gear Rg4B.

The front wheel side power transmitting mechanism 600B includes a front differential gear 610B comprising a front differential case 611B composed of a left differential case 612B provided in the hydraulic clutch mechanism 450B and a right differential case 613B bolted to the left differential case, a differential pinion shaft 614B supported to the front differential case 611B, a differential pinion 615B rotatably supported to the differential pinion shaft 614B, a differential left side gear 616B meshed with the differential pinion 615B at the left and a differential right side gear 617B meshed with the differential pinion 615B at the right. A front left wheel propeller shaft 601B for driving a front left wheel is engaged by spline with an inner circumference of the differential left side gear 616B, while a front right wheel propeller shaft 602B for driving a front right wheel is engaged by spline with an inner circumference of the differential right side gear 617B. Thusly, the power transmitted to the front differential case 611B is dividedly transmitted to the front left wheel propeller shaft 601B and the front right wheel propeller shaft 602B by the operation of the front differential gear 610B.

The rear wheel side power transmitting mechanism 700B comprises a gear wheel 702B fastened to an outer circumference of the center differential case 520B of the center differential mechanism 500B, and a pinion 705B meshed with the gear wheel 702B and integrally formed with a rear wheel propeller shaft 704B connected by spline with the outer circumference of a rear portion of a sleeve yoke 703B for transmitting power to the rear wheel side. The rear wheel propeller shaft 704B is rotatably supported through tapered roller bearings 708B and 709B to the inner circumference of a pinion case 190B fastened to the rear portion of the gear wheel case 170B. Thus, the power transmitted to the ring gear Rg4B is transmitted through the center differential case 520B, gear wheel 702B, pinion 705B, rear wheel propeller shaft 704B and sleeve yoke 703B to a rear drive wheel side.

As mentioned above, since the multi-plate clutch is provided at a side position of the differential gear, a distance among the output shaft of the transmission, the output shaft of the engine and the output shaft of the differential gear may be reduced. Further, since the carrier of the planetary gear as the differential mechanism of the center differential is designed to be an input member, and the sun gear and the ring gear are designed to be output members to the front wheel side power transmitting mechanism and the rear wheel side power transmitting mechanism, respectively, a drive system may be simplified to make the transfer more compact and thereby improve installability to the vehicle.

Although the above-mentioned embodiments are adapted to an automatic transmission employing a planetary gear for the transmission, it should be appreciated that the present invention is not limited to such adaptation, but it may be adapted to other transmissions such as a manual transmission and a V-belt type CVT.

The present disclosure relates to subject matter contained in Japanese Patent Application No. 275825/1984 (filed Dec. 27th, 1984) which is incorporated herein by reference.

It will be understood that the above description of the present invention is susceptible to various modifications, changes and adaptations, and the same are intended to be comprehended within the meaning and range of equivalents of the appended claims.

We claim:
1. A four-wheel drive vehicle comprising:
an engine having an output shaft extending in a transverse direction of a vehicular body;
a transmission having an input shaft connected to the output shaft of the engine and an output shaft connected through a transmission mechanism to the input shaft in parallel with the output shaft;
a drive gear meshed with an output gear connected to the output shaft of the transmission;
a front wheel side power transmitting mechanism;
a rear wheel side power transmitting mechanism;
a center differential mechanism arranged coaxially with the drive gear and having an input member connected to the drive gear, a first output member connected to the front wheel side power transmitting mechanism, and a second output member connected to the rear wheel side power transmitting mechanism to dividedly transmit power to the front wheel side power transmitting mechanism and the rear wheel side power transmitting mechanism; said input member being a front differential gear case housing rotatably supported by a transfer case through a bearing;
a front differential gear arranged coaxially with the center differential mechanism and connected to the first output member of the center differential mech- anism to transmit power to the front wheel side power transmitting mechanism; said front differential gear having a front differential gear case connected to the first output member of the center differential mechanism;

a power converting gear mechanism for converting a rotation about a first axis to a rotation about a second axis being perpendicular to the first axis to transmit power to the rear side power transmitting mechanism, having an input gear provided coaxially with the center differential mechanism and connected to the second output member of the center differential mechanism and an output gear meshed with the input gear to be connected to the rear wheel side power transmitting mechanism; and a hydraulic friction clutch mechanism arranged coaxially with the center differential mechanism and connected between the input member and the second output member to selectively lock the center differential mechanism.

2. The four-wheel drive vehicle as defined in claim 1, wherein said center differential mechanism is arranged in a side position of said front differential gear.

3. A four-wheel drive vehicle comprising:

an engine having an output shaft extending in a transverse direction of a vehicular body;

a transmission having an input shaft connected to the output shaft of the engine and an output shaft connected through a transmission mechanism to the input shaft in parallel with the output shaft;

a drive gear meshed with an output gear connected to the output shaft of the transmission;

a front wheel side power transmitting mechanism;

a rear wheel side power transmitting mechanism;

a center differential mechanism arranged coaxially with the drive gear and comprising a center differential case connected to the drive gear and rotatably supported by a transfer case through a bearing, a ring gear connected to the center differential case, an outer pinion gear meshed with the ring gear, an inner pinion gear meshed with the outer pinion gear, a sun gear meshed with the inner pinion gear and connected to the front wheel side power transmitting mechanism, and a planetary carrier for rotatably supporting the outer pinion gear and the inner pinion gear and connected to the rear wheel side power transmitting mechanism to dividedly transmit power to the front wheel side power transmitting mechanism and the rear wheel side power transmitting mechanism;

a front differential gear arranged coaxially with the center differential mechanism and connected to the sun gear of the center differential mechanism to transmit power to the front wheel side power transmitting mechanism; said front differential gear having a front differential case connected to the sun gear of the center differential mechanism;

a power converting gear mechanism for converting a rotation about a first axis to a rotation about a second axis being perpendicular to the first axis to transmit power to the rear side power transmitting mechanism, having an input gear provided coaxially with the center differential mechanism and connected to the planetary carrier of the center differential mechanism and an output gear meshed with the input gear to be connected to the rear wheel side power transmitting mechanism; and a hydraulic friction clutch mechanism arranged coaxially with the center differential mechanism in an outer circumferential position of the front differential gear, and connected between the ring gear and the planetary carrier to selectively lock the center differential mechanism;

said center differential mechanism is arranged in a side position of said front differential gear and disposed in the transfer case.

4. The four-wheel drive vehicle as defined in claim 3, wherein said hydraulic friction clutch mechanism is connected between the center differential case and an annular projection of the planetary carrier.

* * * * *